March 11, 1969  SHUZO MATSUMOTO  3,432,013
REAR HUB WITH BUILT-IN THREE STAGE SPEED CHANGE
MECHANISM FOR A BICYCLE
Filed June 28, 1967  Sheet 3 of 3
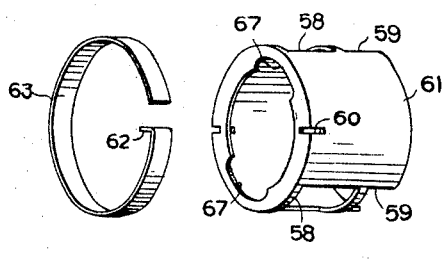
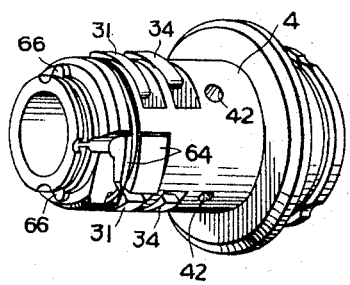
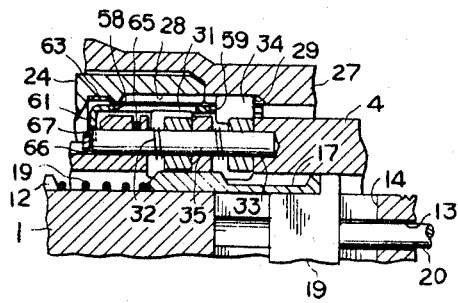
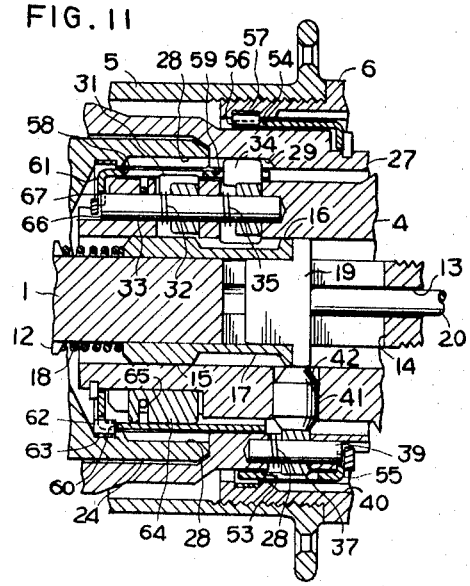

United States Patent Office 3,432,013
Patented Mar. 11, 1969

3,432,013
REAR HUB WITH BUILT-IN THREE STAGE SPEED CHANGE MECHANISM FOR A BICYCLE
Shuzo Matsumoto, Sakai, Japan, assignor to Shimano Kogyo Kabushiki Kaisha, Sakai, Japan
Filed June 28, 1967, Ser. No. 649,601
Claims priority, application Japan, July 5, 1966, 41/43,915
U.S. Cl. 192—6       1 Claim
Int. Cl. F16d 67/00, 41/30

ABSTRACT OF THE DISCLOSURE

Rear hub having a built-in three stage speed change mechanism for a bicycle having a coaster brake operable by rotating the sprocket wheel in the reverse direction, wherein there is provided no clutch heretofore employed in this type of speed change mechanism comprising a planetary gear, the mechanism being so improved that any trouble occurring in speed change operation caused by the presence of the clutch can be removed.

---

In a bicycle rear hub having a built-in speed change mechanism comprising a planetary gear and including a coaster brake, the prior art transmission systems, which have clutches for both transmitting from the driving drum fixed to a chain gear or sprocket wheel to the planet carrier and also to the internal or orbit gear, are shifted through their respective clutches, whereupon it frequently happens that said two clutches in said transmission systems are simultaneously put into engagement, thereby causing inoperativeness by preventing the desired change-over of the transmission, and also sometimes resulting in lost motion treading of the chain pedals and/or damages to the related parts.

The principal object of the present invention is to provide an improved rear hub having a built-in three stage, change speed mechanism of planetary gear type, which is most reliable in operation without any disadvantage as mentioned above, even the coaster brake is combined with such change speed mechanism.

Other objects of the present invention will become apparent from the following detailed description taken in conjunction with the accompanying drawings wherein:

FIGURE 8 is a perspective view showing a control member for controlling the driving pawls for high speed, normal speed and low speed transmission;

FIGURE 9 is a perspective view of the driving drum;

FIGURE 10 is a longitudinal section of a part of the mechanism shown in FIGURE 1, showing the related parts in the position for normal speed transmission; and FIGURE 11 is a similar sectional view showing the related parts in the position for low speed transmission.

Figure 1:
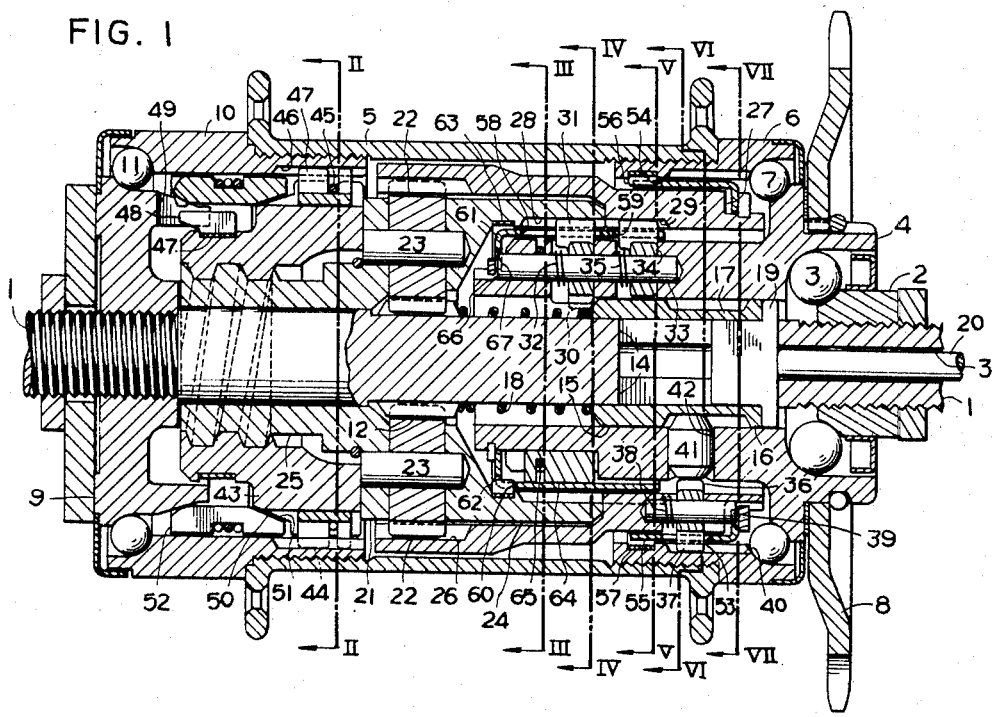
FIGURE 1 is a rear view in longitudinal section of a built-in three stage speed change mechanism for a coaster hub of a bicycle forming an embodiment of the present invention, parts being shown in the position for high speed transmission.
Figure 2:
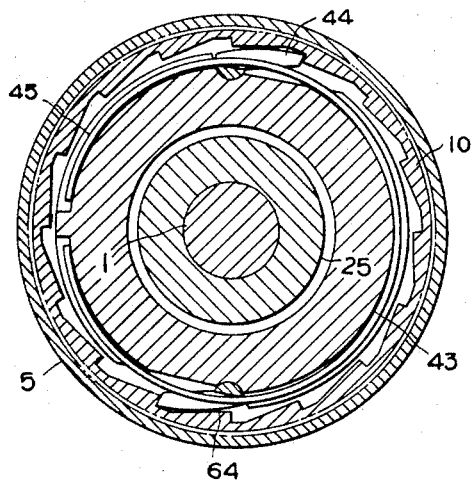
FIGURES 2 to 7 show cross sections taken along lines II—II, III—III, IV—IV, V—V, VI—VI and VII—VII respectively of FIGURE 1.
Figure 3:
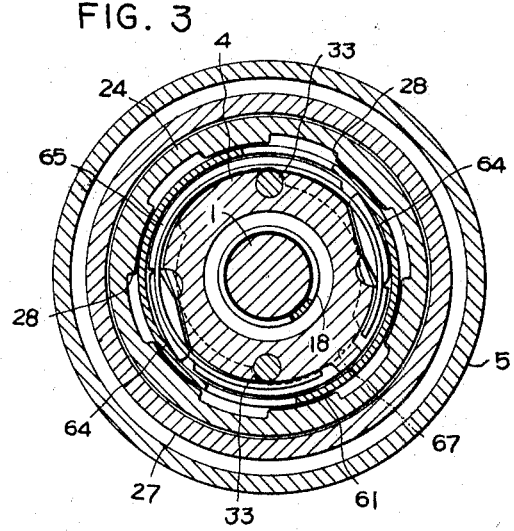

Referring to FIG. 1, the reference numeral 1 designates a rear dead axle of a bicycle, which has at its right hand end a screw threaded hub cone or a ball bearing inner race 2 supporting a driving drum 4 through bearing balls 3. A right hand extension 6 of a hub shell 5 is supported by a radially outwardly projecting flange portion of said driving drum 4 forming an inner face of a ball bearing comprising bearing balls 7. Securely mounted to said flanged portion of the driving drum 4, there is a sprocket wheel 8. At the left hand end, the axle 1 has an end plate 9 screw thread fitted thereto, which supports a mounting extension 10 of the hub shell 5 by means of a similar ball bearing comprising balls 11.

Figure 5:
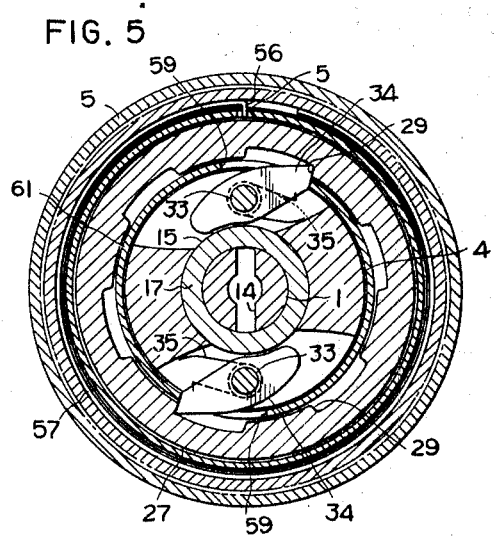
Figure 6:
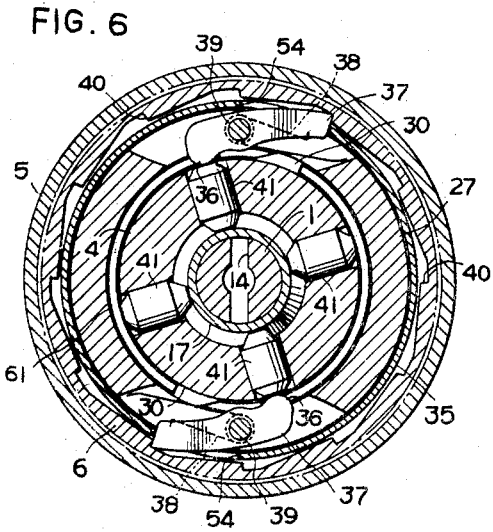
Figure 7:
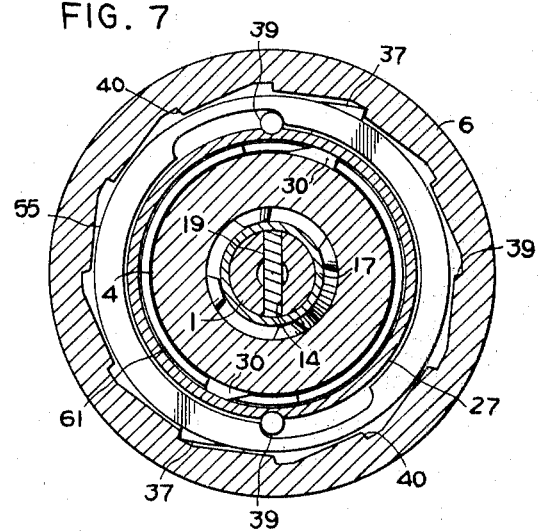

The rear axle 1 has a sun gear 12 mounted at approximately mid portion thereof. In the right hand end portion of the axle 1, there are a concentric guide bore 13 and a diametrically arranged slot 14 (FIGS. 5, 6 and 11). A change-over bushing or ring 17 is slidably mounted on the axle 1. This bushing is provided at the left hand end with an annular flange 15 having inclined guide faces and at the right end with another annular flange 16 having an inner inclined guide face (FIGS. 1, 5, 6, 7, 10 and 11). Between the sun gear 12 and said bushing 17, there is a coil spring 18 which slidably encircles axle 1. A control plate 19 is inserted into said diametrical slot 14 and is provided with radial projecting ears at opposite sides. The inner end of a push rod 20 disposed within the guide bore 13 abuts against the center of the control plate 19, as shown in FIG. 1. It will be seen that said bushing 17 and the control plate 19 are normally biased outwardly by the spring 18, and that by remotely actuating the push rod 20 from a suitable exterior control lever of conventional form (not shown) the change-over bushing 17 can be axially moved inwardly or outwardly along the axle 1.

Figure 4:
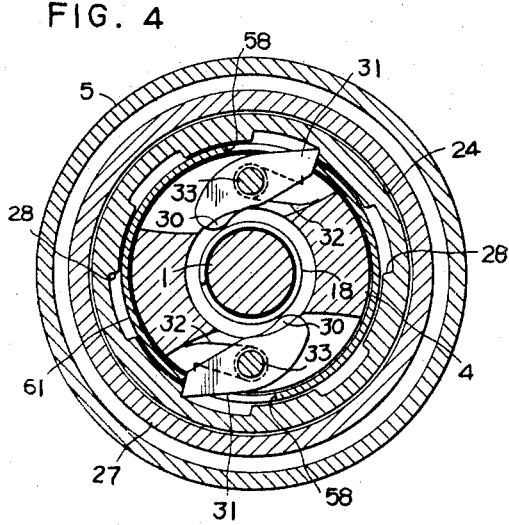

Within the hub shell 5, there is provided a planet carrier 21 carrying a plurality of planet pinions 22, each mounted on a pin 23 and meshing with said gun gear 12. Rightwardly extending cylindrical portion 24 of said planet carrier 21 surrounds the leftward extension of the driving drum 4, leaving an annular space therebetween. On the other hand, the leftwardly extending portion of the planet carrier 21 is formed as a sleeve 25 of smaller diameter and rotatably or loosely mounted on the axle 1,, and is provided with a male screw thread. The righthand end of said screw threaded sleeve 25 lightly abuts against the left side of the sun gear 12. The planet pinions 22 are meshing with a cylindrical orbit or internal gear 26 which has a rightward extension 27 formed as a driven part in contact with the rightward extension cylinder 24 of the planet carrier 21. Said driven cylinders 24 and 27 have their inner walls provided with a plurality of pawl engaging notches 28 and 29, respectively, as better shown in FIGS. 4 and 5. At the inner end or leftward extension of the driving drum 4, there are driving pawls 31, each having a contact tail 30, and pivotally mounted on a pin 33 and normally biased by a spring 32 to bring the tip thereof into driving engagement with the notch 28 in said extension driven cylinder 24 of the planet carrier. Adjacent said driving pawl 31, spaced rightwardly, there are other driving pawls 34, similarly pivoted on the pin 33 and similarly biased by a spring 35 to bring the tip thereof into driving engagement with the notch 29 in the extension driven cylinder 27 of the orbit gear 26.

At the position shown in FIG. 1, in which the control plate 19 pressed by the spring 18 through the changeover bushing 17 assumes the righthand position in the guide slot 14, the annular flange 15 of the change-over bushing 17 is held retracted or shifted to the right out of engagement with the driving pawls 31, thereby enabling said driving pawls 31 as well as said spaced driving pawls 34 together to be erected into engagement with the notches 28 and 29 respectively. According, by such power transmission from the driving pawls 31 to the driven part 24 of the planet carrier 21, the orbit gear 26 is driven by its driven part 27 at increased speed overcoming the speed of the rotation of the other driving pawls 34. When the push rod 20 is actuated to press the control plate 19 to bring the left hand taper face of the annular flange 15 of the change-over bushing 17 into engagement with the contact tail 30 of the driving pawl 31, the tip of the driving pawl 31 is disengaged from the notch 28 of the driven part 24 of the planet carrier 21, so that only the driving pawl 34 is held in engagement with the notch 29 of the driven 27 of the internal gear extension so as to keep the latter in rotation.

As will be seen from the foregoing, the hub shell 5 will be driven by rotation of the planet carrier 21, the planet pinions 22 and the orbit gear 26 by means of the driving pawls 31 and, in the case of low speed transmission, the driven part 27 being directly driven from the pawls 34 in the driving drum 4 transmit power through the orbit gear 26, the planet pinions 22 and the planet carrier 21 to the hub shell 5. In the case of high speed and normal speed transmission, the driven part 27 is directly connected to the hub shell 5. Adjacent to the righthand end portion of the driven part 27 of the orbit gear extension, there are driving pawls 37, each having a contact tail 36 and pivotally mounted on a pivot pin 39 and biased by a spring 38 normally tending to erect or radially extend the pawl 37. The inner wall of the hub shell extension 6 is provided with ratchet-like saw teeth 40. The driving drum 4 is provided with radial holes 42, into each of which a push pin 41 having at its inner end a tapered face is mounted (FIGS. 1 and 6). Said tapered ends of the push pins 41 are formed to complementally co-operate with the spaced annular flanges 15 and 16 of the change-over ring or bushing 17. When the said change-over bushing 17 is fully moved toward the lefthand position, attendant the shifting to obtain low speed power transmission, said push pin 41 are cammed out radially when acted upon by said righthand tapered flange 16, so that said push pins 41 will each engage with a tail 36 of the pawls 37, thereby bringing the respective tips of said pawls to be disengaged from said saw teeth 40. When the driven part 27 of the orbit gear 26 is out of power transmission with the driving pawls 34, and when the change-over bushing 17 is not in the position for low speed transmission, the push pins 41 for the driving pawls 37 are forced inwardly by the action of the springs 38 holding the pawls extended. On the contrary, when said driving pawls 37 are put into operation, in co-operation with the driving pawls 31 and 34, it is possible to attain high speed transmission and normal speed transmission respectively. However, when the push pins 41 are cammed out, direct connection of the driven part 27 with the hub shell 5 is precluded.

Apart from the aforementioned high speed transmission and the normal speed transmission, the low speed transmission to the hub shell 5 is effected by directly transmitting the rotation of the planet carrier 21. For the purpose, an element constituting a coaster brake hereinafter to be described is utilized. An annular brake frame 43 is complementally thread mounted on the threaded sleeve 25, which is extended leftwardly from the planet carrier 21, and said brake frame 43 rotates in unison with the sleeve 25 according to the rotation of the driving drum 4. Radially outward of the righthand portion of said brake frame 43, there are two driving pawls 44 disposed in diametrically symmetrical positions, and each of which are biased by a spring 45 normally tending to radially extend or erect the same. The inner wall of the hub extension 10 is formed as a saw toothed orbit gear 46 having enough width to match the stroke of said brake frame 43. While the driving pawls 44 are slid in the reversed direction relative to the saw toothed orbit gear 46 during high speed and normal speed transmission, contrary thereto the said pawls 44 are extended and positively utilized for low speed transmission to the hub shell 5.

With respect to the three stage change speed mechanism as mentioned above, it is necessary to devise the mechanism so that brake can be applied any time during any speed transmission condition. For this purpose, at the lefthand end portion of said brake frame 43, there is wound a resilient band 47 having an ear 48 at its one end, which ear 48 being adapted to abut against another ear 49 fixed to the end plate 9, so that the rotation of the brake frame 43 in the reverse direction is prevented. The brake frame 43 is adapted to be moved leftwardly upon rotation of the screw threaded sleeve 25 caused by the rotation of the reverse driving drum 4. The brake frame 43 is provided with a tapered face 50 which is adapted to co-operate with a tapered friction face 51 provided on a brake ring 52 fixed to the hub extension 10.

The driving pawls 31, 34 and 37 rotate in the reverse direction and slip over the notches 28, 29 and the saw toothed internal gear 40, respectively, upon the rotation of the driving drum 4 in the reverse direction. In case it should happen that the tip of the driving pawl stops in contact with the stepped edge of a notch or a saw tooth, it will become impossible to release the brake for restarting the bicycle by applying rotation in the normal direction. When the driving drum 4 rotates in the reverse direction, the driven part 27 of the internal or orbit gear 26 is liable to be rotated in the reverse direction for a larger angle of rotation, and in such case the driving pawl 34 is liable to be acted belatedly and the tip thereof might impinge upon said driven part 27; therefore, it is necessary to have the tips of all driving pawls retracted at the start of the rotation of the driving drum 4 in the reverse direction. In accordance therewith, with respect to the driving pawl 37, the righthand end portion of the driven part 27 of the orbit gear 26 is provided with a dish-like control ring or frame 55 (FIGS. 1 and 6), which has holes 53, diametrically symmetrically arranged and each adapted to receive the tip of the driving pawl 37, and it also has similar holes or slots 54 at leftwardly off-set position (FIGS. 1 and 6).

A band spring 57 having a hook 56 at its one end is wound around the control frame 55, the arrangement being such that upon the rotation of the driven part 27 of the orbit gear 26 in the normal forward direction the band spring 57 also rotates together with the latter, whereas upon rotation of the part 27 in the reverse direction the band spring 57 will be tensioned and pressed against the inner wall of the hub shell extension 6, thereby suppressing the rotation of the control frame 55 in the reverse direction, and allowing retraction of the driving pawl 37 upon rotation of the driving drum 4 in the reverse direction.

With respect to the driving pawls 31 and 34, as shown in FIGS. 1 and 9, the lefthand end portions of the driving drum 4 is provided with a cylindrical control frame 61 having opposed holes 58 and slots 59 disposed adjacently from which the tips of the driving pawls 31 and 34, respectively, can protrude, and having at least one slit 60 in the outer end thereof. A band spring 63 having at its one end a hook 62 is wound around said control frame, with said hook 62 inserted into the slit 60, the arrangement being such that, similarly as with the above mentioned bandspring 57, the tips of the driving pawls 31 and 34 can be retracted upon the rotation of the driving drum 4 in the reverse direction. In order to positively transmit rotation in the reverse direction to the driven part 24 of the planet carrier 21 in lieu of the driving pawls 31 and 34 retracted in the above manner, the lefthand end portion of the driving drum 4 is provided with driving pawls 64 (FIGS. 1, 2, 3, 9 and 10) normally biased into the erected position by means of the extended or spring 65. The driving drum 4 and the control frame 61 are respectively provided with radial projections 66 and arcuate receiving recesses 67 (FIGS. 9 and 8), the arrangement being such that upon the rotation of the control frame 61 in the reverse direction the driving pawls 31 and 34 are retracted, and thereupon with the reverse driving pawls 64 thusly erected the projections 66 in the driving drum 4 will come into engagement with the receiving recesses 67 of the control frame 61, whereby the pawls 64 are held erected and the tips thereof act upon the stepped portions of the notches 28 of the driven part 24 of the planet carrier 21.

From the foregoing it will be seen that according to the present invention a clutch per se is not employed in the transmission and speed change mechanism, so that potential trouble which might be caused by simultaneous engagement of two transmission systems to be changed over would be avoided, and that it will also be possible to effectively avoid any trouble and lost motion treading of the pedal caused by belated changeover operation. Especially with respect to the operation for changing over from the rotation in the reverse direction for applying coaster brake to the rotation in the normal direction for normal running of the bicycle, any trouble liable to occur at such change-over time may be effectively prevented according to this invention.

What I claim is:

1. A rear bicycle hub having a built-in three stage speed change mechanism and equipped with a coaster brake, comprising:
    (a) a hub shell having a righthand extension,
    (b) a rear dead axle,
    (c) a driving sleeve or drum having an inner extension and rotatably mounted on said dead axle near the righthand extension of said hub shell,
    (d) a rotatable sprocket wheel securely mounted on said driving drum,
    (e) a planetary gear mechanism including a planet carrier, an orbit gear having a cylindrical righthand extension, and a sun gear on said dead axle,
    (f) connecting means adjacently disposed on the planet carrier and the orbit gear respectively, for effecting respective and joint rotation,
    (g) separate means on the planet carrier for driving said hub shell upon rotation of the sprocket wheel in the normal direction,
    (h) said coaster brake including interengageable friction members and a brake frame mounted on the planet carrier and adapted to interengage said friction members responsive to actuation upon reverse rotation of the sprocket wheel and driving drum,
    (i) first driving pawls engageable with said connecting means on the planet carrier only during high speed transmission,
    (j) second driving pawls constantly engaging with the other adjacent connecting means on the orbit gear for normal speed,
    k) said first and second driving pawls being pivotally mounted on the inner extension of said driving drum and arranged in parallel with each other,
    (l) third driving pawls pivotally mounted to the righthand extension of said orbit gear and selectively disengageable from said hub shell only during low speed transmission,
    (m) change-over means including a ring bushing slidably mounted on said dead axle,
    (n) said change-over bushing including cam means engageable with and actuatable to hold said first and third driving pawls in operative positions, and
    (o) control ring means surrounding said driving drum and actuatable for simultaneously retracting said first, second and third driving pawls, said control ring means and other driving pawls mounted on said drum for positively transmitting rotation in the reverse direction to said planet carrier.

References Cited

UNITED STATES PATENTS

| | | | |
|---|---|---|---|
| 3,021,728 | 2/1962 | Shimano | 74—750 |
| 3,257,868 | 6/1966 | Preece | 74—750 |
| 3,366,206 | 1/1968 | Shimano | 74—758 X |

ARTHUR T. McKEON, *Primary Examiner.*

U.S. Cl. X.R.

74—750